(No Model.)

A. E. THOMINE.
PIPE COUPLING FOR COMPRESSED AIR CONDUITS.

No. 580,607. Patented Apr. 13, 1897.

Witnesses
Inventor
Alexandre E. Thomine
by Pollok & Mauro
his attorneys.

UNITED STATES PATENT OFFICE.

ALEXANDRE EDMOND THOMINE, OF PARIS, FRANCE.

PIPE-COUPLING FOR COMPRESSED-AIR CONDUITS.

SPECIFICATION forming part of Letters Patent No. 580,607, dated April 13, 1897.

Application filed February 2, 1897. Serial No. 621,652. (No model.)

*To all whom it may concern:*

Be it known that I, ALEXANDRE EDMOND THOMINE, of Paris, France, have invented certain new and useful Improvements in Pipe-Couplings for Compressed-Air Conduits, which are fully described in the following specification.

The object of this invention is to secure by effective and simple means the hermetic closing of the ends of pipe-sections of a conduit designed to convey compressed air or other fluid under high pressure.

The invention is illustrated in the accompanying drawings, in which—

Figure 2:
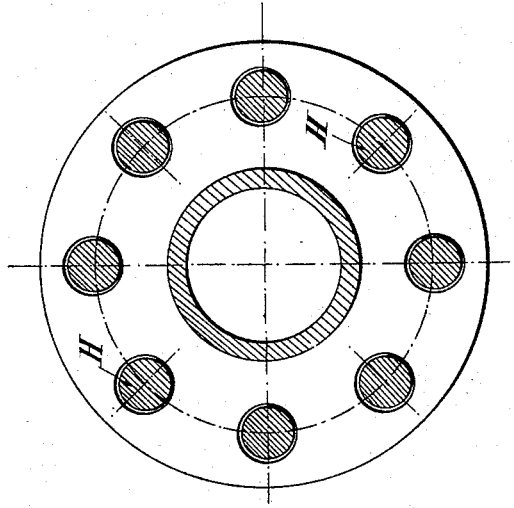
Figure 1:
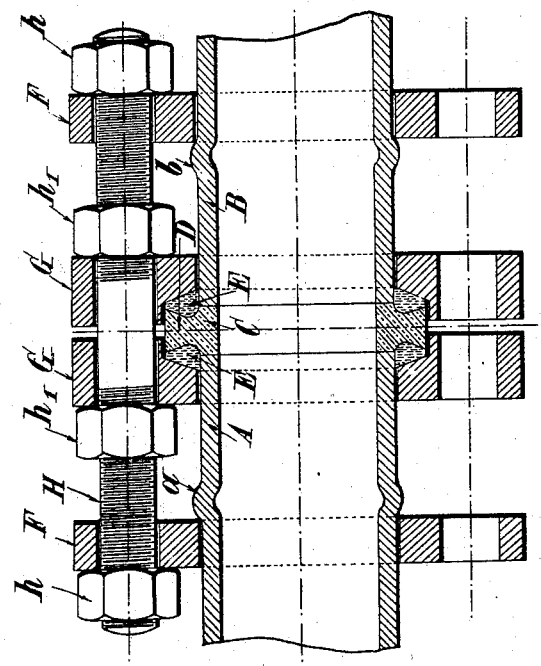

Figure 1 is a longitudinal section showing parts or sections of a pipe or conduit connected by the joint forming this invention, and Fig. 2 is a transverse section of the same.

On each of the two pipe-sections A B, which are to be connected, at a certain distance from their ends, is formed by suitable means, and preferably by means of a hot mandrel, a circular boss or rib $a\,b$, forming an exterior projection or shoulder. These ribs serve as bearings upon which the force is applied to press the ends of the pipe together until hermetic tightness is effected. The ends of the pipe-sections, which are without flanges, after having been dressed, are placed opposite each other at a sufficient distance apart to permit the introduction between them of a ring C. This ring may be made of copper or other metal sufficiently malleable. The interior diameter of ring C is the same as that of the conduit. Exteriorly it projects beyond the conduit and is of dovetail form in cross-section. Each section A B has a clamping-plate F F bearing upon the shoulder $a\,b$ and perforated for the threaded bolts H, whereby the ends of the pipes are pressed tightly against the ring C. Each pipe-section has also at its end other disks or plates G, also perforated for the passage of the bolts H. The pressure-disks G are interiorly recessed to receive the projection of ring C, the walls of the recesses being inclined, so as to form an approximately-triangular space on each side of ring C. These spaces are occupied by a suitable compressible or yielding packing material E, covering the joints between the ring and the pipe-sections.

Bolts H have each four nuts $h\,h'$. Nuts $h$ serve to draw together the ends of the pipe-sections by bearing on the clamping-plates F, while nuts $h'$ effect the compression of the packing and closure of the joint by drawing together the pressure-disks G.

Pipe-sections A B being placed end to end with ring C between them, and the clamping plates and rim disposed as hereinbefore described, the closing is effected by first screwing nuts $h$ and then nuts $h'$.

In case a joint is to be repaired it is only necessary to unscrew these nuts, remove ring C and the packing, renewing these parts.

Having thus described my invention, what I claim as new, and desire to secure by Letters Patent, is—

1. The improved pipe-coupling, comprising in combination, a metallic ring interposed between the ends of the pipe-sections, said ring having an annular projection, clamping-plates, bolts and nuts for forcing the ends of the sections into close contact with the ring, pressure-disks, surrounding the ends of the pipe-sections and recessed to receive the ring, yielding packing between the ring and pressure-disks, and means for forcing the latter toward each other, substantially as described.

2. The combination with two pipe-sections, having each a shoulder near its end, of a ring interposed between the sections and forming part of the conduit, said ring having an exterior dovetailed projection, clamping-plates bearing on said shoulders, pressure-disks interiorly recessed to receive the projecting part of the ring, packing material between the ring and disks, threaded bolts passing through the plates and disks, and nuts for the plates and disks, substantially as described.

In testimony whereof I have signed this specification in the presence of two subscribing witnesses.

ALEXANDRE EDMOND THOMINE.

Witnesses:
 J. ALLISON BOWEN,
 ANTONY RAUSSAMNET.